United States Patent
Kaufman

(10) Patent No.: US 7,398,841 B2
(45) Date of Patent: Jul. 15, 2008

(54) VEHICLE POWER ASSIST BY BRAKE, SHOCK, SOLAR, AND WIND ENERGY RECOVERY

(76) Inventor: Jay Stephen Kaufman, 24 Scotland Rd., Kingston, NH (US) 03848

( * ) Notice: Subject to any disclaimer, the term of this patent is extended or adjusted under 35 U.S.C. 154(b) by 409 days.

(21) Appl. No.: 11/124,594

(22) Filed: May 9, 2005

(65) Prior Publication Data

US 2005/0252696 A1 Nov. 17, 2005

Related U.S. Application Data

(60) Provisional application No. 60/571,640, filed on May 17, 2004.

(51) Int. Cl.
*B60K 16/00* (2006.01)
*B60K 6/00* (2007.10)
*F01B 21/04* (2006.01)

(52) U.S. Cl. .................. 180/2.2; 180/165; 180/69.5; 60/671; 60/716; 62/53.2; 62/513

(58) Field of Classification Search .................. 62/615, 62/53.2; 60/716, 626, 39.6; 180/2.2, 2.1, 180/302, 165
See application file for complete search history.

(56) References Cited

U.S. PATENT DOCUMENTS 4,163,367 A * 8/1979 Yeh .............................. 60/414
4,295,538 A * 10/1981 Lewus ......................... 180/165
4,354,565 A * 10/1982 Latter et al. ................. 180/69.5
5,460,239 A * 10/1995 Jensen ......................... 180/302
5,680,764 A * 10/1997 Viteri ........................... 60/716
5,725,062 A * 3/1998 Fronek ......................... 180/2.2
6,138,781 A * 10/2000 Hakala ......................... 180/2.2

* cited by examiner

*Primary Examiner*—Cheryl Tyler
*Assistant Examiner*—John Pettitt

(57) ABSTRACT

An energy conversion apparatus and method using recovered energy sources including motor vehicle kinetic energy (deceleration and shock) and wind resistance, supplemented by liquefied air transferred to the vehicle and by solar radiation thereto. The energy sources are combined, as available, to drive a compressor for supplying intake working fluid of a motor vehicle prime mover, wherein liquefied air provides pre-compression cooling of an atmospheric air portion of the working fluid. The liquefied air is made by recovered energy, stored and transferred between vehicles and between vehicles and stationary sites. In a hybrid version of the vehicle, exhaust heat from a combustion engine part of the prime mover increases working fluid temperature in a gas expander part, thereof; the engine and expander operating independently or together for improved vehicle propulsion efficiency.

20 Claims, 3 Drawing Sheets

VEHICLE POWER ASSIST BY BRAKE, SHOCK, SOLAR, AND WIND ENERGY RECOVERY

CROSS REFERENCE TO RELATED APPLICATIONS

This application claims priority of Provisional Application Ser. No. 60/571,640, filed May 17, 2004.

BACKGROUND OF THE INVENTION

This invention presents an energy converter to recover and combine diverse motor vehicle energy sources for supplying compressed working fluid to a motor vehicle prime mover, wherein a liquefied air portion of the working fluid provides pre-compression cooling of an atmospheric air portion thereof; the liquefied air being made by recovered energy, stored and transferred between vehicles and between vehicles and stationary sites.

Increased fuel mileage and range in conjunction with low grade fuels has long been a goal of automotive design, to make driving more economical, to conserve fossil fuels, and to reduce emission of combustion products. Recovery and combining of vehicle energy sources as available, including kinetic (deceleration and shock), wind resistance, and solar radiation, is not described in the prior art. In addition, coordinated storage and transfer of recovered energy using pneumatic, cryogenic and electric systems is not described in the prior art. Recovery of only the deceleration component of kinetic energy, coordinated with electrical transfer between batteries and generators, is used in lightweight hybrid vehicles to provide limited performance improvement. Relevant vehicle energy recovery and consumption devices described in the prior art have disadvantages, as follows:

(a) U.S. Pat. No. 1,671,033 to Kimura (1928) describes a transmission with an electric generator and battery storage for recovery of vehicle deceleration, the component of vehicle kinetic energy in the direction of travel. The recovered energy, normally dissipated by engine compression and vehicle braking, is stored in batteries and used for limited electrical power assist. Deceleration energy is not completely recoverable due in part to insufficient battery capacity.

(b) U.S. Pat. No. 3,688,859 to Hudspeth and Lunsford (1972) describes compressors connected between the frame and axles of a vehicle for recovery of shock, the upward component of vehicle kinetic energy. The recovered energy, normally dissipated by shock absorbers, is used for limited pneumatic power assist. Shock energy is not completely recoverable due to compression heating.

(c) U.S. Pat. No. 6,138,781 to Hakala (2000) describes an electric generator for recovery of vehicle wind energy. The recovered energy, normally dissipated by vehicle drag force, is used for limited electrical power assist. Potential wind energy recovery is not realized because air from a wind recovery device is discharged to relatively high wake pressure. In addition, aerodynamic vehicle shapes are often used to reduce drag loss at the expense of vehicle function, such as carrying capacity.

(d) U.S. Pat. No. 5,725,062 to Fronek (1998) describes the use of a solar photo-voltaic panel atop a vehicle for recovery of solar energy radiating to a vehicle. The recovered energy, normally dissipated to the atmosphere, is used for limited electrical power assist. Solar radiation to a vehicle is not completely recoverable due in part to insufficient battery capacity.

(e) U.S. Pat. No. 4,182,960 to Reuyl (1980) describes transfer of electrical energy between vehicles and stationary sites. Solar energy recovered at a site is stored in batteries to provide power to the site and a portion is transferred to, and stored in batteries in a hybrid gas turbine-electric vehicle. The gas turbine can provide power to the site via an electric generator to supplement site solar energy. Battery storage problems include space and weight limitation, trade-off between battery life and energy discharged, replacement handling, charge time, and ventilation.

Research programs at the University of Washington ("Ultra-Low Emission Liquid Nitrogen Automobile" Knowlen, Mattick, Hertzberg, and Bruckner, SAE-1999-0102932, 1999) and the University of North Texas ("Cryogenic Heat Engines for Powering Zero Emission Vehicles", Ordonez, Plummer, and Reidy, IMEECE2001/PID-25620, 2001) describe a liquefied gas system to supply liquid nitrogen for on-board storage and use in zero emissions vehicles powered by ambient temperature heat engines. Transfer of liquefied gas between vehicles and from vehicles to stationary sites, for use thereof, is not described in the prior art. Liquefied gas transfer problems include boil-off and fill and drain connection.

(f) The prior art describes several types of gas liquefiers including; vapor-compression, magnetic, Stirling cycle and thermo-acoustic, for stationary application. State-of-the-art air liquefiers require compression work of approximately 2.5 times the heat removed per 2.2 kg (1 lb) of air liquefied.

(g) Gas turbine engine powered vehicles are described in the prior art and were produced by Rover and by Chrysler Corporation during the 1950's and 1960's. Gas turbine engines require high turbine inlet temperature to provide acceptable thermal efficiency. Other problems include high compression work, high turbine blade and exhaust gas temperature, and expensive heat exchangers. Operation is characterized by falling efficiency with load and compression braking is unavailable. Low grade fuels such as kerosene can be burned, however emissions are high due to high fuel consumption and formation of compounds at high temperature.

(h) U.S. Pat. No. 4,294,323 to Boese (1981) describes a gas expander using cryogenic liquid working fluid. Cryogenic expanders have low specific expansion energy due to heat input at ambient temperature. Research programs at the University of Washington ("Ultra-Low Emission Liquid Nitrogen Automobile" Knowlen, Mattick, Hertzberg, and Bruckner, SAE-1999-0102932, 1999) and at the University of North Texas ("Cryogenic Heat Engines for Powering Zero Emission Vehicles", Ordonez, Plummer, and Reidy, IMEECE2001/PID-25620, 2001) describe development of liquid nitrogen expanders with emphasis on maximizing output by designing for quasi-isothermal expansion. Expanders have limited usefulness in lightweight, short range, low speed vehicles for zero emission urban use.

(i) U.S. Pat. No. 3,525,874 to Toy (1970) describes a hybrid gas turbine-electric prime mover, and U.S. Pat. No. 3,566,717 to Berman (1971) describes a hybrid transmission for parallel operation of a combustion engine and an electric motor. Recovered deceleration energy, normally dissipated by engine compression and vehicle braking, is stored in batteries and used for power assist in hybrid vehicles. Combustion engine efficiency is low, and deceleration is not completely recoverable due in part to insufficient battery capacity.

SUMMARY OF THE INVENTION

It is an object of the present invention, therefore, to provide systems for recovery of energy dissipated by a motor vehicle, as well as solar radiation.

It is another object of the present invention to provide systems for storage and transfer of recovered energy.

It is still another object of the present invention to provide systems for efficient consumption of recovered energy.

It is yet another object of the present invention to provide a prime mover capable of burning renewable fuel with improved emissions.

In keeping with these objects and others which may become apparent the present invention seeks to provide a unified energy system to recover, store, transfer and consume energy dissipated by motor vehicles, or otherwise available thereto. In essence, combining recoverable energy sources as available yields greater benefit than when taken individually. For example, full potential of a gas turbine is realized using recovered energy to provide the compressed air requirement.

Combined recovery of vehicle energy sources including kinetic (deceleration and shock), wind resistance, and solar radiation to compress atmospheric air provides substantial vehicle power assist. Recovery is by compression of atmospheric air for consumption as working fluid in vehicle prime movers. Liquefied air is imported to the vehicle as a form of energy storage by providing pre-compression cooling of prime mover working fluid. In addition, a liquefier makes supplementary liquefied air using excess recovered energy, such as during high speed driving when vehicle wind resistance, a function of the third power of speed, predominates. Excess liquefied air is transferred from the vehicle for use in other vehicles or at stationary sites. The recoverable portion of energy dissipated by a vehicle, estimated in accordance with standard highway driving cycle US-06, is: deceleration, 25%; wind resistance, 10%; shock, 10%. In addition 91 kg (200 lb) of imported liquefied air effectively increases the recovered total by 25% and clear day solar radiation adds another 8%. Energy recovery by diverse means enhances performance over a wide range of driving conditions, providing a three-fold increase in prime mover efficiency, because prime mover compression by recovered energy is a virtual energy loss. Accordingly, advantages of the present invention are illustrated as follows:

(a) A feature of the energy system in accordance with the present invention lies in providing an energy recovery transmission for recovery of vehicle deceleration energy by compression of atmospheric air.

(b) Another feature of the energy system in accordance with the present invention lies in providing energy recovery shock absorbers with cryogenic cooling for efficient compression of atmospheric air.

(c) Another feature of the energy system in accordance with the present invention lies in providing an energy recovery turbine to drive an atmospheric air compressor. The turbine operates on the difference between wind impact pressure and wake pressure at high suction locations behind an air dam, the windshield/roof intersection, and other leading edges. Vehicle shapes are designed for the best use of recovered wind energy as it effects vehicle cost, carrying capacity and style.

(d) Another feature of the energy system in accordance with the present invention lies in providing an energy recovery solar-electric panel to drive an atmospheric air compressor. Energy is recovered during parking, stopping and driving of a vehicle.

(e) Another feature of the energy system in accordance with the present invention lies in providing air compression and liquefied air storage of recovered energy, plus capability to transfer liquefied air between vehicles or between vehicles and stationary sites. In addition, air compression provides vehicle braking assist.

(f) Another feature of the energy system in accordance with the present invention lies in providing an on-board vehicle air liquefier to liquefy suitably pure atmospheric air. Required liquefier compression is equivalent to that of state-of-the-art liquefiers, however work input using recovered vehicle energy is a virtual energy loss.

(g) Another feature of the energy system in accordance with the present invention lies in providing a compact and efficient gas turbine prime mover. Compression work, using recovered vehicle energy above approximately 25% turbine load, is a virtual energy loss. Pre-compression cooling of working fluid with liquefied air enables reduced turbine inlet and exhaust temperatures. Heat input is from a renewable fuel, such as methanol. Efficiency is relatively constant over the load range and low fuel consumption lowers emissions while (h) Another feature of the energy system in accordance with the present invention lies in providing a quasi-isothermal liquefied air expander for urban driving. Compression work, using recovered vehicle energy, is a virtual energy loss.

(i) Still another feature of the energy system in accordance with the present invention lies in providing a gas turbine/air expander with virtual compression to power a hybrid vehicle. The gas turbine operates independently and efficiently over a wide load range. The expander and gas turbine operate in parallel with the added benefit of turbine exhaust heat recovery into the working fluid of the expander. The expander operates independently during urban driving when the gas turbine is least efficient.

Other general and more specific objects and advantages of the present invention will in part be obvious and will in part appear from the drawings and description which follows.

BRIEF DESCRIPTION OF THE DRAWINGS

Objects and advantages of the present invention will become apparent from the following when read in conjunction with the accompanying drawings and reference numerals list, wherein solid lines connecting components indicate fluid flow, arrows indicate flow direction, and dashed lines indicate electrical connection.

REFERENCE NUMERALS

FIG. 1

Figure 1:
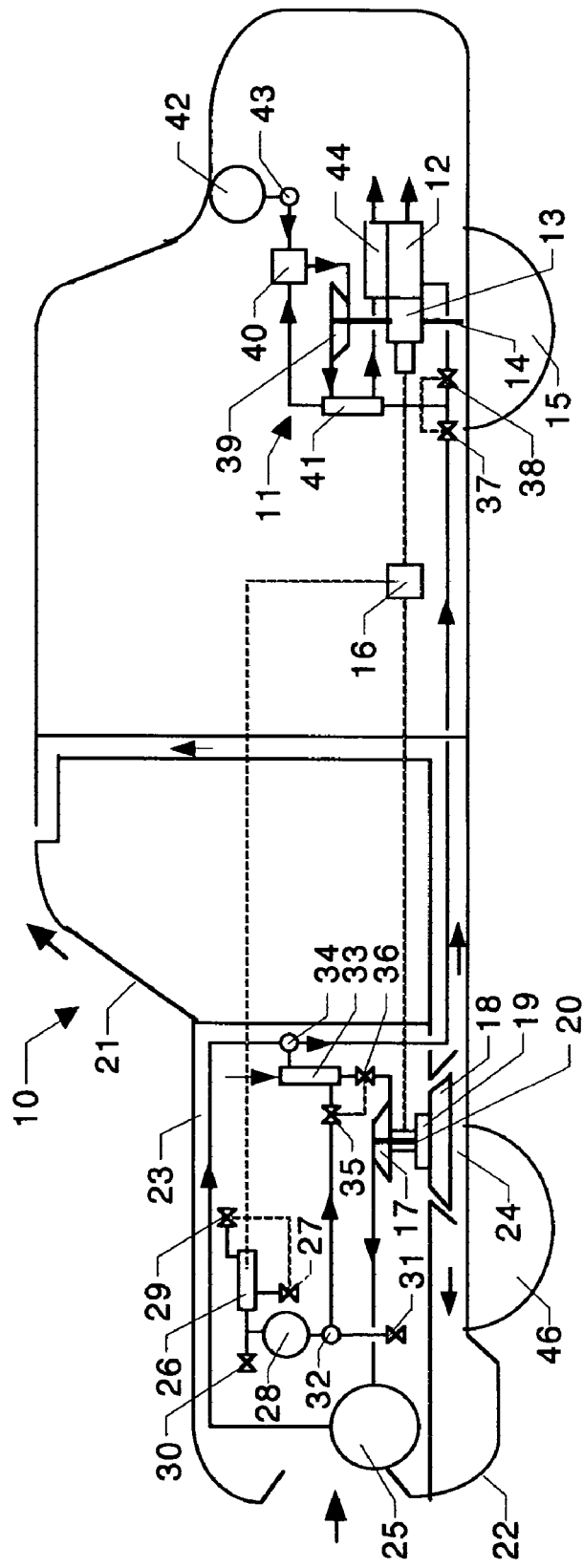
FIG. 1 is a schematic illustration showing connection of components of an energy recovery, storage, transfer and consumption system in a motor vehicle.

10 vehicle
11 gas turbine engine
12 air expander
13 transmission-generator drive
14 shaft
15 rear wheel-axle assembly -continued

Figure 2:
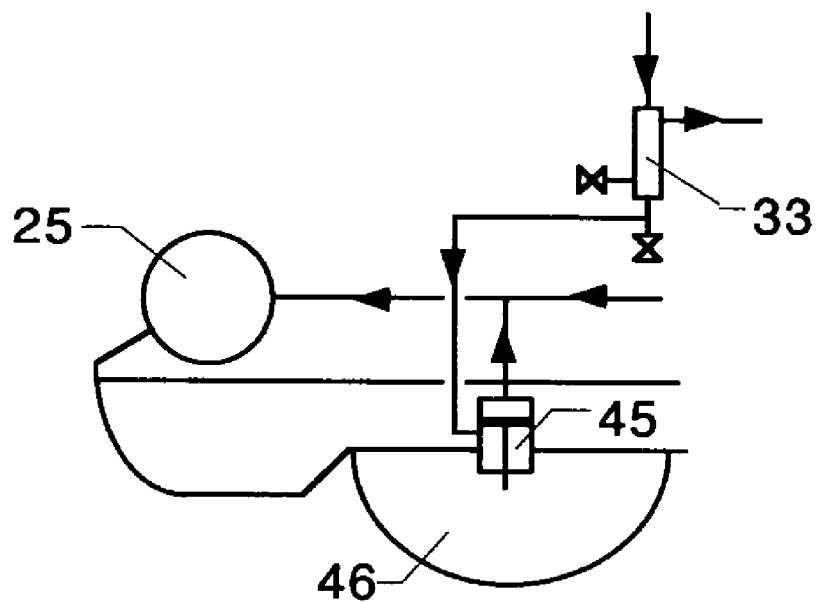
FIG. 2 is a schematic illustration of one of four shock compressors connected in the motor vehicle of FIG. 1.

REFERENCE NUMERALS 16 motor controller
17 motor-compressor
18 axial wind drive
19 clutch
20 motor-compressor shaft
21 windshield
22 air dam
23 compartment
24 air duct
25 compressed air tank
26 air liquefier
27 liquefier intake valve
28 liquid air tank
29 vent valve
30 liquid air fill valve
31 liquid air drain valve
32 liquid air pump
33 evaporator
34 header
35 pumped air valve
36 compressed air valve
37 throttle
38 expander valve
39 gas turbine
40 combustor
41 recuperator
42 fuel tank
43 fuel pump
44 heating jacket
45 circulating fan
FIG. 2

Figure 3:
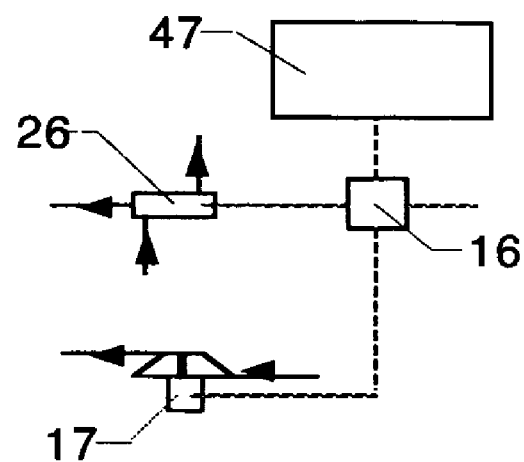
FIG. 3 is a schematic illustration of a solar electric panel connected to drive an air compressor in the motor vehicle of FIG. 1.

46 shock compressor drive (typical)
47 front wheel-axle assembly
FIG. 3

48 solar photo-voltaic panel

DESCRIPTION OF PREFERRED EMBODIMENTS

FIG. 1 illustrates a preferred embodiment of the energy recovery, storage, transfer and consumption system of the present invention installed in a motor vehicle 10. An engine 11 combined with an air expander 12 by a transmission-generator drive 13 provides prime mover propulsion to the vehicle via a shaft 14 and a rear wheel-axle assembly 15. Deceleration energy is recovered by drive 13, which is electrically connected to a motor controller 16 to power a motor-compressor 17. Wind energy is recovered by an axial wind drive 18 connected to motor-compressor 17 through a clutch 19, which provides torque to a motor-compressor shaft 20 when wind energy is sufficient. Drive 18 operates on the difference between impact pressure and wake suction pressure behind a windshield 21 and an air dam 22. Impact air pressurizes a compartment 23 and discharges through an air duct 24. Motor-compressor 17 compresses air into a compressed air tank 25. An air liquefier 26 draws atmospheric air through a liquefier intake valve 27 and discharges liquefied air to a liquefied air tank 28 while venting through a vent valve 29. liquefied air is transferred to the vehicle into tank 28 through a liquefied air fill valve 30 and transferred from the vehicle through a liquefied air drain valve 31.

Liquefied air is pressurized by a liquefied air pump 32 and vaporizes while cooling atmospheric air in an evaporator 33. The cooled air is pressurized by motor-compressor 17, mixed with the vaporized air in a header 34, and the mixture delivered to the engine and the expander under control of a pumped air valve 35 and a compressed air valve 36. The ratio of expander air to combustion air is controlled by a throttle 37 and an expander valve 38.

Engine 11 is a gas turbine 39 connected to a combustor 40 and a recuperator 41. Fuel is stored in a fuel tank 42 and pressurized by a fuel pump 43. Combustion products from the recuperator pass through a heating jacket 44 of the expander to atmosphere.

Evaluation of vehicle highway performance is based on US-06 (Supplemental Federal Test Procedure) for 6 hours at average speed of 77 km/hr (48 mph). US-06 is the most aggressive real highway driving cycle and illustrates the combination of deceleration drive 13 and wind drive 18. Methanol fuel is selected because it is renewable, air requirements are low due to oxygen content, and large scale production is enabled by use in high efficiency engines. With an initial fill of 91 kg (200 lb) of liquefied air, "gasoline equivalent mileage" is 25 km/l (150 mpg) and liquefied air consumption is 113 kg (250 lb), for a distance 463 km (288 mi). Evaluation of vehicle urban performance is based on LA-92 (California Air Resources Board) for 4 hours at average speed of 40 km/hr (25 mph). LA-92 is the most aggressive real urban driving cycle and illustrates operation when vehicle speed is too low for effective recovery of wind energy. Efficient operation is with engine 11 off, expander 12 operating on air from tank 25, and wind drive 18 disengaged by clutch 19. With an initial fill of 91 kg (200 lb) of liquefied air, "liquefied air equivalent mileage" is 1.9 km/kg (0.53 mi/lb) for a distance 161 km (100 mi).

Drive 13 recovers deceleration energy while prime mover air consumption drops, providing electrical power to motor-compressor 17 and liquefier 26 based on pressure in tank 25. Drive 18 recovers wind energy during forward motion of the vehicle above approximately 56 km/hr (35 mph) due to difference of 2.5 velocity heads between vehicle impact pressure and wake suction pressure behind windshield 21 and air dam 22. Excess wind energy for liquefied air production is recovered at an increasing rate, proportional to the third power of vehicle speed. Estimated deceleration recovery is 75% of vehicle acceleration and estimated wind recovery is 25% of vehicle wind resistance.

Quasi-isentropic motor-compressor 17 normally maintains expander and engine air pressure in tank 25 at 300 K (540 R), 4 mPa (40 atm) with valve 27 and 30 closed and valves 35 and 36 open. Estimated efficiency of the motor compressor is 80%.

Air liquefier 26 operates on over-pressure in tank 25 to deliver 23 kg (50 lb) of liquefied air to tank 28 during 6 hours of US-06 driving with valve 29 open and valves 27 and 30 closed. Estimated liquefaction energy is 1395 kj/kg (600 btu/lb) of liquefied air produced; approximately twice the ideal and one-half the energy input of commercial liquefiers.

Combined engine 11 and expander 12 deliver up to 71 kW (95 hp) to meet US-06 vehicle acceleration. Engine output is 15100 kJ/kg (6500 btu/lb) of fuel with an air-fuel ratio of 15, and turbine inlet temperature is 1500 K (2700 R) at 4.0 mPa (40 atm). Methanol consumption is 1.5 kg/hr (3.3 lb/hr) with total liquefied air of 19 kg/hr (42 lb/hr). Engine exhaust gas, including latent heat of condensable products, maintains jacket 45 inlet air temperature of 444 K (800 R) at 4.0 mPa (40 atm), and exhaust temperature of 300 K (540 R). Expander output is 1400 kJ/kg (600 btu/lb) of liquefied air, and drops by 50% with the engine off and no exhaust heating. Estimated engine and expander efficiencies are 85%.

FIG. 2 illustrates an embodiment of the present invention for recovery of vehicle shock energy. A four shock compressor drive 45 (typical), connected to each end of rear wheel-axle assembly 15 and to each end of a front wheel-axle assembly 46, provides compressed air from evaporator 33 into tank 25.

Drive 45 recovers an additional 9% of US-06 driving resistance, increasing fuel mileage of the FIG. 1 configuration by 12% and liquefier output by 58%. Air from evaporator 33 at 94 K (170 R) is compressed into tank 25 at 300 K (540 R), 4 mPa (40 atm) by action of the shock compressor drive due to reciprocating wheel-axle motion. Recovered shock energy is estimated at 30% of rolling resistance, a function of road surface roughness, vehicle speed, and tire pressure, as well as bearing friction.

FIG. 3 illustrates an embodiment of the present invention for recovery of solar radiation by a solar photo-voltaic panel 47 atop the vehicle. Electrical output from the panel to controller 16 powers motor-compressor 17 and liquefier 26.

Panel 47 recovers an equivalent 8% of US-06 driving resistance, increasing fuel mileage of the FIG. 1 configuration by 8% and liquefier output by 48%. Because energy recovery also occurs during vehicle inactivity, liquefier output accumulates. Recovered energy is based on a representative 4.6 m2 (50 ft2), 20% efficient panel in sun. Atmospheric air is compressed into tank 25 at 300 K (540 R), 4 mPa (40 atm).

Although the description above contains many specifics, these should not be construed as limiting the scope of the invention, but only to provide illustrations of some of the preferred embodiments of this invention. For example;

The energy recovery, storage, transfer and consumption system of the present invention can be used in trucks and other vehicle types using any suitable fuel or working fluid.

Deceleration, wind, shock and solar energy can be recovered in combination to provide mechanical or electrical drive of prime mover working fluid compressors or other vehicle components.

Electric batteries can be used to supplement energy storage.

Vapor-compression, two phase expansion, magnetic, thermo-acoustic, thermo-electric and Stirling liquefiers can be used, and emissions features such as air separation for constituent liquefaction can be added. A liquefier expansion-engine can be used for power assist of vehicle components.

Diesel or other engine types can be used separately or in combination with a gas expander as series or parallel hybrid prime movers. A gas turbine engine can have performance features such as working fluid reheat; and emissions features such as separation of carbon dioxide from combustion products, support of combustion by oxygen enriched air, and combustion cooling by water, nitrogen or other fluid. A gas expander can have performance features such as injection of heat transfer fluid to increase temperature and improve expansion isothermicity of the working fluid.

Thus the scope of the invention should be determined by the appended claims and their legal equivalents, rather than the examples given.

I claim:

1. A method for recovering, storing and transferring energy dissipated by a vehicle, comprising the steps of:
    driving a wind energy recovery means by differential pressure between air impacting said vehicle and air in selected wake regions of said vehicle, and by air flow through said recovery means due to said differential pressure,
    transferring liquefied air from a source external to said vehicle to a liquefied air storage means connected to said vehicle,
    producing additional liquefied air by a liquefier means driven by said wind energy recovery means,
    cooling atmospheric air drawn from around said vehicle with said liquefied air and said additional liquefied air in a heat exchange means connected to said vehicle, while producing vaporized liquefied air and cooled atmospheric air,
    pressurizing said cooled atmospheric air by a cryogenic compression means driven by said wind energy recovery means to produce compressed atmospheric air, and
    transferring any excess liquefied air from said vehicle.

2. The method of claim 1 further comprising the additional steps of:
    pressurizing said vaporized liquefied air, and
    mixing said vaporized liquefied air with said compressed atmospheric air to produce an intake working fluid for a prime mover.

3. The method of claim 1 further comprising the additional steps of,
    diverting a portion of said compressed atmospheric air for providing a working fluid to a gas expander portion of a prime mover means, and
    transferring exhaust heat from a combustion engine portion of said prime mover means to said working fluid of said gas expander portion of said prime mover means.

4. A working fluid air and heat sink fluid supply system for a prime mover of a motor vehicle comprising:
    a wind energy recovery turbine driven by differential pressure between air impacting said vehicle and air in selected wake regions of said motor vehicle, and by air flow through said turbine due to said differential pressure,
    a storage tank for containing liquefied air,
    a pump for pressurizing said liquefied air,
    an evaporator for transferring heat from additional atmospheric air drawn from around said vehicle while producing vaporized liquefied air,
    a compressor driven by said turbine for compressing said additional atmospheric air from said evaporator to produce intake working fluid for a prime mover,
    a liquefier for conversion of a suitably pure atmospheric air to additional liquefied air,
    an expander valve for providing a diverted portion of said intake working fluid and,
    a heating jacket for heating said diverted portion of said intake working fluid,
    wherein said intake working fluid provides expansion energy, fuel oxidation and combustion cooling for said prime mover; said diverted portion of said intake working fluid provides expansion energy for a portion of said prime mover; and said liquefied air and said additional liquefied air provides cooling of said intake working fluid air as heat sink fluid of said prime mover.

5. The method of claim 1 further comprising the step of producing additional liquefied air by a shock absorption energy recovery means.

6. The method of claim 5 wherein said step of producing further liquefied air by shock absorption energy recovery means comprises the step of compressing atmospheric air with a shock compressor drive connected to a wheel-axle assembly of said vehicle.

7. The method of claim 6 wherein said step of producing further liquefied air by said shock absorption energy recovery means further comprises the step of cooling said atmospheric air prior to said step of compressing step.

8. The method of claim 1 further comprising the step of producing further liquefied air by a deceleration energy recovery means.

9. The method of claim 8 wherein said step of producing further liquefied air by said deceleration energy recovery means comprises the steps of generating electrical power from said deceleration energy drive, transmitting said power to an electric motor compressor, and compressing additional atmospheric air using said electric motor compressor.

10. The method of claim 1 further comprising the step of producing further liquefied air by a solar energy recovery means.

11. The method of claim 10 wherein said step of producing further liquefied air by solar energy recovery means comprises the steps of generating electrical power from a photovoltaic panel, transmitting said power to an electric motor compressor, and compressing additional atmospheric air using said electric motor compressor.

12. The method of claim 10 further comprising the step of producing still further liquefied air by a deceleration energy recovery means.

13. The method of claim 12 further comprising the step of producing still further liquefied air by a shock absorption energy recovery means.

14. The system of claim 4 further comprising mixing means for mixing liquefied air with an exhaust gas from said compressor.

15. The system of claim 4 further comprising a shock absorption energy recovery means for recovering shock energy from said motor vehicle and producing further liquefied air, wherein said shock absorption energy recovery means is in fluid communication with said storage tank.

16. The system of claim 15 wherein said shock absorption energy recovery means comprises a shock compressor drive connected to a wheel-axle assembly of said motor vehicle.

17. The system of claim 4 further comprising a deceleration energy recovery means for recovering deceleration energy from said motor vehicle and producing further liquefied air, wherein said shock absorption energy recovery means is in fluid communication with said storage tank.

18. The system of claim 17 wherein said deceleration energy recovery means comprises a deceleration energy drive adapted to transfer deceleration energy into electrical power, and an electric motor compressor in electrical communication with said deceleration energy drive and in fluid communication with said storage tank.

19. The system of claim 4 further comprising a solar energy recovery means for converting solar energy into electricity and producing further liquefied air.

20. The system of claim 19 wherein said solar energy recovery means comprises a photovoltaic panel and an electric motor compressor in electrical communication with said deceleration energy drive and in fluid communication with said storage tank.

* * * * *